United States Patent

Asano et al.

[11] Patent Number: 4,660,410
[45] Date of Patent: Apr. 28, 1987

[54] KNOCK SENSOR

[75] Inventors: Shogo Asano; Juhei Takahashi, both of Yokohama, Japan

[73] Assignee: Matsushita Electric Industrial Co., Ltd., Kadoma, Japan

[21] Appl. No.: 664,867

[22] Filed: Oct. 25, 1984

[30] Foreign Application Priority Data

Oct. 25, 1983 [JP] Japan .............................. 58-165067[U]
Oct. 26, 1983 [JP] Japan .............................. 58-165643[U]

[51] Int. Cl.⁴ ............................................. G01L 23/22
[52] U.S. Cl. ......................................... 73/35; 310/329
[58] Field of Search ..................... 73/35, 654; 310/329, 310/346

[56] References Cited

U.S. PATENT DOCUMENTS

| | | | |
|---|---|---|---|
| 3,453,457 | 7/1969 | Hayer et al. | 310/329 |
| 4,254,354 | 3/1981 | Keem | 73/35 |
| 4,371,804 | 2/1983 | Peng et al. | 73/35 |
| 4,374,472 | 2/1983 | Nishimura | 73/35 |
| 4,473,768 | 9/1984 | Kerr et al. | 310/329 |
| 4,497,198 | 2/1985 | Takahashi et al. | 73/35 |

Primary Examiner—Stewart J. Levy
Assistant Examiner—John E. Chapman, Jr.
Attorney, Agent, or Firm—Wenderoth, Lind & Ponack

[57] ABSTRACT

A knock sensor has a substrate having a projection at the center of one surface thereof and a bore at the center thereof, a vibrating plate having a bore at the center thereof and having a plate rigidifying projection means at the center portion of one surface thereof, the central portion being welded to the projection on the substrate, a piezoelectric ceramic element having a bore in the center thereof and electrodes on opposite faces thereof and secured to the other surface of the vibrating plate, and a terminal having a lead projection extending through the bore in the substrate, the bore in the vibrating plate and the bore in the piezoelectric ceramic element and connected to the electrode on the face of the piezoelectric ceramic element which faces away from the vibrating plate.

11 Claims, 15 Drawing Figures

KNOCK SENSOR

TECHNICAL FIELD OF THE INVENTION

This invention relates to a knock sensor for a knocking control system for an internal combustive engine, which sensor detects the existence of knocking in the engine and controls the ignition timing thereof.

The knocking control system serves to detect vibrations in an engine block, judge the existence of knocking from the vibration waveform, control the ignition timing of the engine, and improve the fuel consumption.

The knock sensor of the invention is used as a vibration pickup in such knocking control system.

Figure 12:
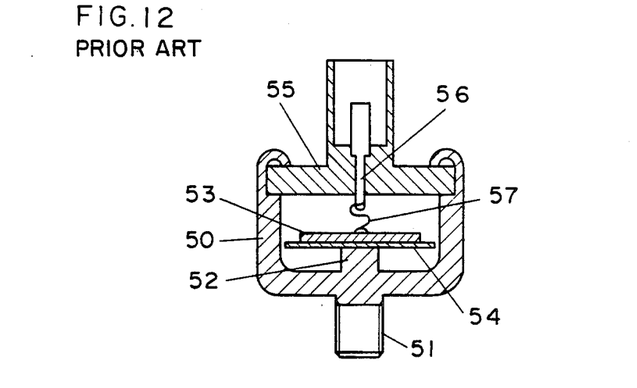
FIG. 12 is a sectional view of a prior art knock sensor.

Referring to FIG. 12, a conventional knock sensor is shown. In FIG. 12, reference numeral 50 designates a casing, which has an outwardly extending threaded projection 51 integral with the bottom thereof which is to be fixed to an engine block. An internal projection 52 integral with the bottom projects into the casing 50. 53 designates a piezoelectric ceramic slate, which is fixed to a vibrating metal plate 54, the vibrating metal plate 54 being fixed at the center to the projection 52. 55 designates a connector member, through which a terminal 56 extends, the connector member 55 being sealed at its outer periphery to an opening of casing 50. 57 designates a flexible wire connected at one end to the terminal 56 and soldered at the other end to the piezoelectric ceramic plate 53.

In FIG. 12, vibrations in the engine are transmitted to the vibrating metal plate 54 and piezoelectric ceramic 53 through the casing 50 so that electric signals corresponding to the vibrations are generated from the piezoelectric ceramic plate 53. These electric signals are picked up and transmitted to the exterior through the flexible wire 57 and terminal 56.

The above conventional device, however, has been found to be defective because the flexible wire, which vibrates due to vibrations in the engine, is liable to be disconnected. Also, since the vibrating plate 54 and piezoelectric ceramic plate 53 are assembled and the flexible wire 57 is connected thereto within the casing 50, the assembly and connection are difficult to carry out. Furthermore, the conventional device has been restricted to a frequency band width characteristic of −3 dB and has poor responsiveness.

OBJECTS AND BRIEF SUMMARY OF THE INVENTION

A first object of the invention is to provide a knock sensor which has a simple construction, is easy to assemble, and is easy to electrically connect.

A second object of the invention is to provide a knock sensor which does not have an abnormal peak or dip in the frequency characteristics.

A third object of the invention is to widen the −3 dB band width of the frequency characteristics so as to improve the responsiveness.

The invention will now be described in greater detail in connection with the accompanying drawings, in which:

DETAILED DESCRIPTION OF EMBODIMENTS

Figure 2:
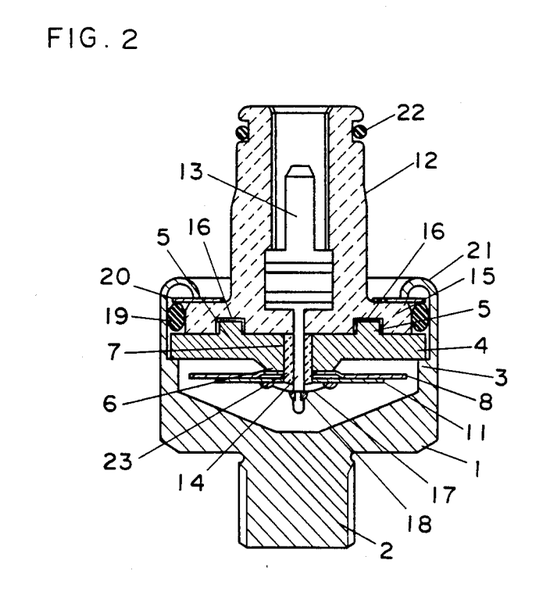
FIG. 2 is an axial sectional view of the knock sensor of FIG. 1.
Figure 3A:
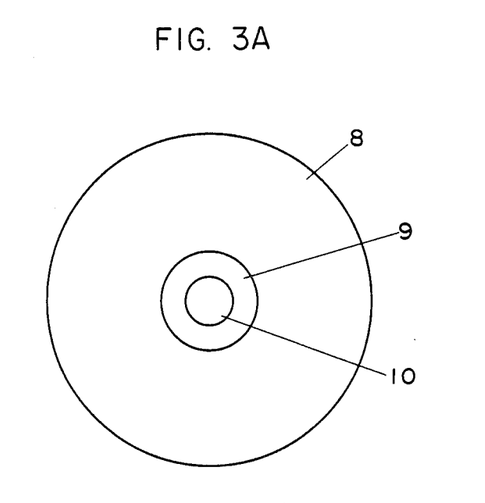
FIG. 3A and FIG. 3B are plan and sectional views of a vibrating plate of the knock sensor of FIGS. 1 and 2.
Figure 3B:
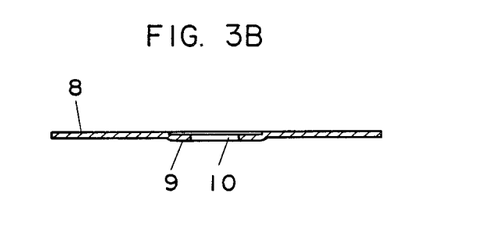

A first embodiment of a knock sensor of the invention will be described in connection with FIGS. 1 and 2, in which reference numeral 1 designates an electrically conductive casing, which is open upwardly and provided at the lower portion with a threaded portion 2, 3 designates a shoulder, to which a conductive substrate 4 is resistance-welded around the circumference thereof, the substrate 4 being provided on one surface thereof with a plurality of projections 5 integral therewith and at the center on the other surface with a projection 6 integral therewith, 7 designates a through bore in the center of substrate 4 through projection 6, 8 designates an electrically conductive vibrating plate, which has at the center a projection 9 formed by a drawing process and as shown in FIGS. 3A and 3B. A bore 10 is formed in the projection 9, and projection 9 is fixed by being welded to the projection 6 on the substrate 4. A plate-shaped piezoelectric ceramic element 11 is provided at the center with a bore and on both surfaces with silver electrodes, the piezoelectric ceramic element 11 being secured to one surface (the upper surface in FIG. 3B) of vibrating plate 8 by use of an adhesive. A connector unit 12 formed of an insulating material is provided into which a terminal 13 is embedded, a lead projection 14 integral with or connected to the terminal 13 projecting downwardly from a larger diameter base 15 formed integrally with the lower portion of connector unit 12. The base 15 is provided in the lower surface thereof with recesses 16 into which the projections 5 on the substrate 4 are press-fitted respectively, and 17 designates a lead terminal comprising metallic foil, through which the lead projection 14 at the terminal 13 extends and is soldered at 18 to the lead terminal 17, the lead terminal 17 being soldered at the outer periphery to the electrode on the piezoelectric ceramic element 11. An O-ring is disposed around the outer periphery of base 15 of the connector unit 12, and 20 designates an annular regulation plate, the O-ring 19 and regulation plate 20 being inserted and thereafter the thin portion around the opening of casing 1 is inwardly curled at 21 to complete the knock sensor. An O-ring is mounted on the outer periphery of the upper portion of connector unit 12.

Next, an explanation will be given of the procedure of assembling the knock sensor.

At first, the projection 9 on one surface of vibrating plate 8 is fixed by being welded to the projection 6 on the lower surface of substrate 4, then the piezoelectric ceramic element 11 is adhered to the other surface of vibrating plate 8. Then the projections 5 on the substrate 4 having the vibrating plate 8 and piezoelectric ceramic element 11 fixed thereto are press-fitted into the recesses 16 in the connector unit 12 respectively, thereby fixing the substrate 4 to the lower end face of base 15 of the connector unit 12. Next the through bore 7 at the substrate 4 is filled with an insulating material 23. Next, the substrate 4 and base 15 of connector unit 12 are inserted into the casing 1 and the circumference of substrate 4 is welded to the shoulder 3 in the casing 1, the O-ring 19 and regulation plate 20 are mounted on the connector unit 12, and the thin portion around the opening of casing 1 is curled inwardly to thereby complete the knock sensor.

Figure 1:
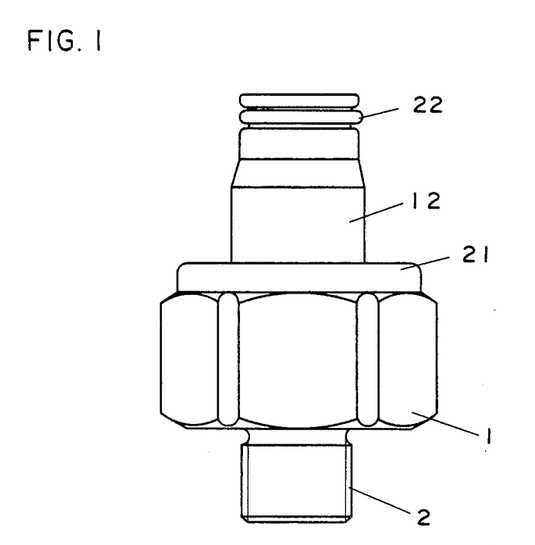
FIG. 1 is a side elevation view of a first embodiment of a knock sensor of the invention.

The knock sensor shown in FIGS. 1 and 2 has the threaded portion 2 on the casing 1 threaded into, for example, a threaded bore in an engine block and is mounted thereon so that vibrations of the engine block are transmitted to the vibrating plate 8 and piezoelectric ceramic element 11 through the threaded portion 2, casing 1 and substrate 4 to thereby output between the electrodes on both sides of piezoelectric ceramic element 11 electric signals corresponding to the vibrations. One electrode on one side of piezoelectric ceramic element 11 is grounded through the vibrating plate 8, substrate 4 and casing 1 and the other electrode on the other side of the element 11 is electrically connected to the terminal 13 through the lead terminal 17 and lead projection 14, thereby enabling the output piezoelectric ceramic element 11 to be obtained between the terminal 13 and ground.

Next, an explanation will be given of the adjustment of the resonance frequency of the knock sensor of the invention.

In this embodiment, in order to enlarge the band width, the ratio of the diameter of the vibrating plate 8 to the diameter of the piezoelectric ceramic element 11 is given a predetermined value of about $\sqrt{2}:1$. In a case where the diameters of both the vibrating plate 8 and piezoelectric ceramic element 11 are simultaneously increased while keeping the diameter ratio therebetween about $\sqrt{2}:1$, the resonance frequency becomes low. On the other hand, when the diameters of both members are simultaneously reduced keeping the above value of the ratio, the resonance frequency becomes high. It is of course practical to carry out fine adjustment within ±5% by changing the diameter of vibrating plate 8 only.

Also, the ratio of the thickness of the vibrating plate 8 to the thickness of the piezoelectric ceramic element 11 has an influence on the band width so that when the band width is enlarged, the thickness ratio should be kept at about 1:1 and a resistance of $1/\omega_o C_o$ is connected as a load to both the members (where $\omega_o = 2\pi f_o$, fo: resonance frequency, and Co: capacity of piezoelectric ceramic). Alternatively, the resistance of $1/\omega_o C_o$ may be connected to a control circuit exterior of the sensor, or housed in the sensor.

Figure 4:
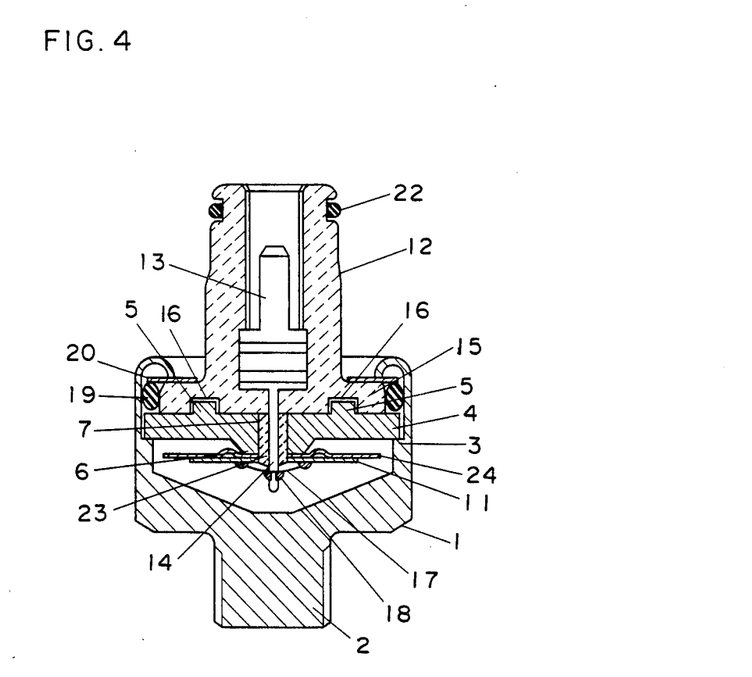
FIG. 4 is an axial sectional view of a second embodiment of the knock sensor of the invention.
Figure 5A:
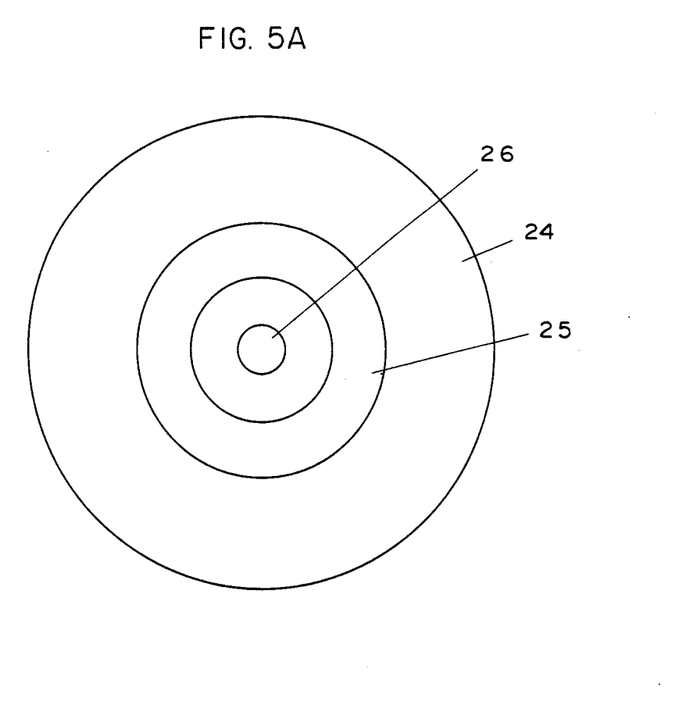
FIGS. 5A and 5B are plan and sectional views of a vibrating plate of the knock sensor of FIG. 4.
Figure 5B:
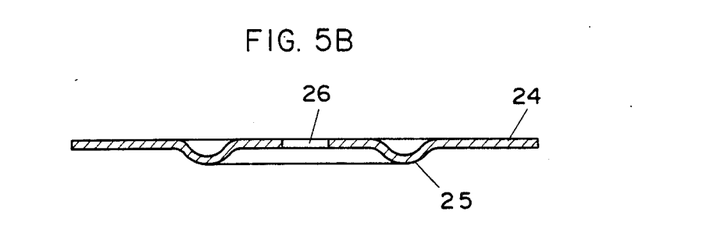

Referring to FIG. 4, a second embodiment of the knock sensor of the invention is shown, which is the same as the first embodiment except for the vibrating plate. Referring to FIGS. 5A and 5B, the vibrating plate 24 in the second embodiment is shown in detail. The vibrating plate 24 is subjected to bead-processing to form an annular projection 25, and is provided at the center with a bore 26. In FIG. 5B, the piezoelectric ceramic element 11 is fixed to the lower surface of vibrating plate 24, and the vibrating plate 24 is welded at the center of the upper surface thereof to the projection 6 on the substrate 4.

Figure 6:
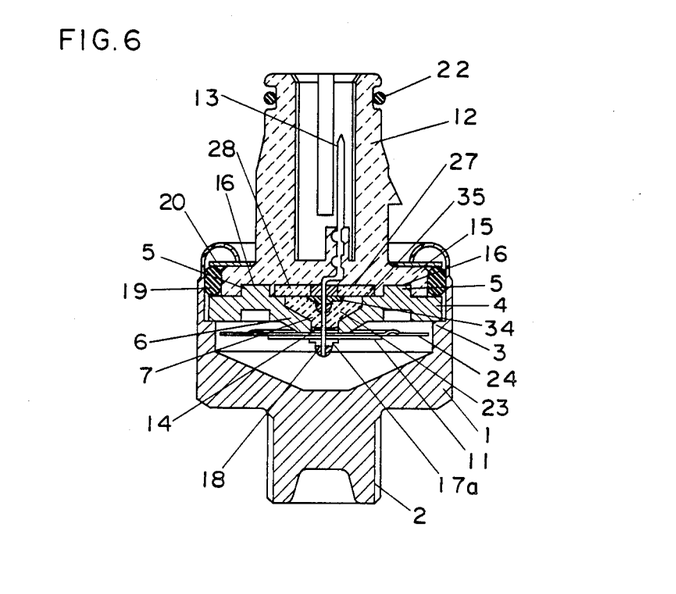
FIG. 6 is an axial sectional view of a third embodiment of the knock sensor of the invention.
Figure 7:
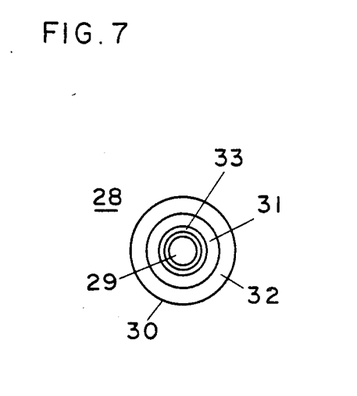
FIG. 7 is a plan view of a resistance member of the knock sensor of FIG. 6.
Figure 8:
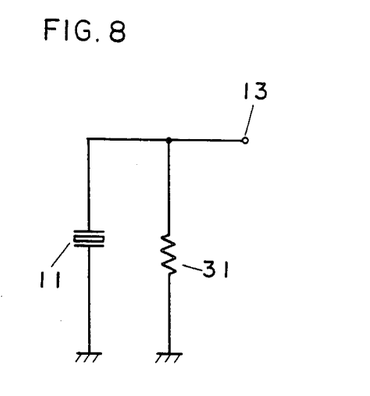
FIG. 8 is an equivalent circuit diagram of the resistance member of FIG. 7.
Figure 9:
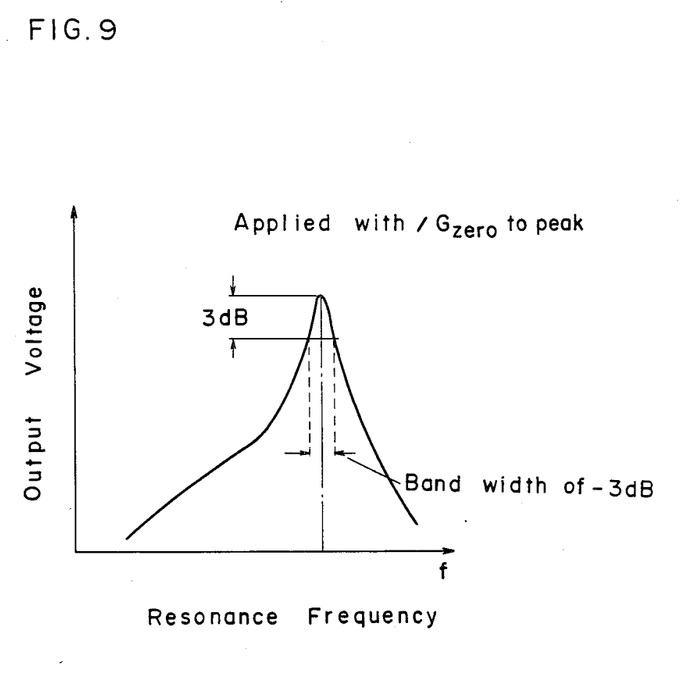
FIG. 9 is a graph of frequency characteristics of the knock sensor of the invention.

A third embodiment of the knock sensor of the invention is shown in FIGS. 6, in which the components corresponding to those in the first and second embodiments are designated by the same reference numerals. In addition, the third embodiment uses a lead terminal 17a shown in FIG. 11. In FIG. 6, reference numeral 27 designates a recess formed at the central portion of the lower surface of the base 15 of the connector unit 12, the recess 27 receiving therein a resistance member 28. The resistance member 28, as shown in FIG. 7, comprises a ring-like-shaped ceramic substrate 30 having at the center a bore 29, a ring-like-shaped resistor 31 is baked onto one surface of substrate 30, and ring-like-shaped electrodes 32 and 33 are formed at the outer periphery and inner periphery of resistor 31, the resistor 31 being electrically connected between the electrodes 32 and 33. Reference numeral 34 designates metallic foil, the center of which is soldered to the lead projection 14 at the terminal 13, the metallic foil 34 being soldered at the outer peripheral portion thereof to the electrode 33 at the inner periphery of resistance member 28. In addition, the electrode 32 at the outer periphery of resistance member 28 is fixed to the substrate 4 with a conductive adhesive at 35. Therefore, the resistor 31 is electrically connected between the terminal 13 and the substrate 4 (ground) and is consequently connected in parallel to the piezoelectric ceramic element 11 as shown in FIG. 8. In a case where the resistor 31, as in this embodiment, is connected in parallel with the piezoelectric ceramic element 11, the band width of −3 dB shown in FIG. 9 becomes larger.

Next, an explanation will be given on the order of assembling the knock sensor in the third embodiment. At first, the resistance member 28 is fitted into the recess 27 in the connector unit 12 integral with the terminal 13, and the metallic foil 34 is inserted onto the lead projection 14 at the terminal 13 and soldered at the peripheral portion to the inside electrode 33. Thereafter, the center of metallic foil 34 is soldered to the lead projection 14, the resistance member 28 is connected to the terminal 13. Conductive adhesive 35 has been previously screen-process-printed onto the outside electrode 32 at the resistance member 28. Thus, the assembly of resistance member 28 with the connector unit 12 is finished and subsequently the assembly of the vibration unit is carried out in the following order:

Firstly, the vibrating plate 24 is welded to the projection 6 on the substrate 4, next the piezoelectric ceramic element 11 is fixed to the vibrating plate 24, the lead projection 14 projecting from the lower surface of connector unit 12 is inserted into bores in the substrate 4 and corresponding parts, projections 5 on the substrate 4 are fitted into recesses 16 respectively. Then, an insulating material 23 is filled into the bores in the substrate 4 and corresponding parts, and metallic foil 17a is soldered to the lead projection 14 and a silver electrode on the piezoelectric ceramic. Such assembly of connector unit 12 and substrate 4 and the other parts is inserted into the opening of casing 1 and the substrate 4 is welded to the shoulder 3 of the casing 1, and after an O-ring 19 and a regulation plate 20 are inserted, the edge of the opening on the casing 1 is bent inwardly, thereby completing the knock sensor.

The above third embodiment, which uses the resistance member 28 comprising the resistor 31 baked to the ceramic substrate 30, is advantageous in that it withstands high temperature, reduces variation in the resistance value, and improves the reliability. Also, since the resistance member 28 is incorporated in the connector in the connector unit 12 and the vibrating plate 24 and piezoelectric ceramic element 11 are mounted on the substrate 4, the assembly work is easy, and connection of lead projection 14 at the terminal 13 with the electrode 33 on the resistance member 28 and that of lead projection 14 with the piezoelectric ceramic element 11 are easy. Also, since the electrode 33 inside the resistor 31 is soldered to the metallic foil 34, the knock sensor in this embodiment is advantageous in that it can respond flexibly to motion of lead projection 14 at the terminal 13 caused by a difference in the coefficient of thermal expansion between the resin and the metal. Furthermore, the electrode 32 outside the resistor 31, which is adhered to the substrate 4 with the conductive adhesive at 35, is hardened at a temperature of 100° to 105° C., thereby giving the advantage that the connector unit 12 is not discolored.

Figure 10:
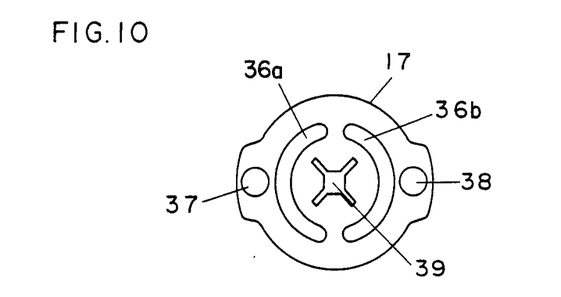
FIG. 10 is a plan view of a lead terminal used in the knock sensor of the invention.

Referring to FIG. 10, there is shown the lead terminal 17 used in the first embodiment in FIG. 2 and the second embodiment in FIG. 4. In FIG. 10, reference numerals 36a and 36b designate slits in the shape of a circular arc, 37 and 38 designate bores, and 39 designates a center bore, the lead terminal 17 being soldered to the electrode on the piezoelectric ceramic element 11 by use of the bores 37 and 38, and the lead projection 14 at the terminal 13 being inserted into the center bore 39 and soldered to the lead terminal 17.

Figure 11A:
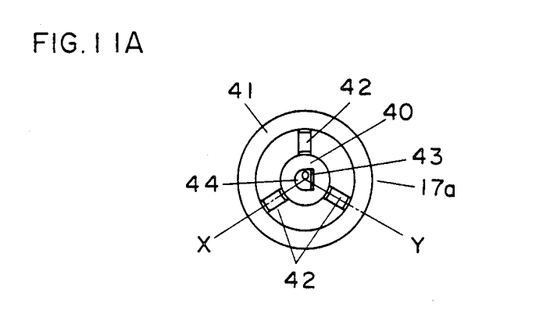
FIGS. 11A and 11B are plan and sectional views of a modified lead terminal.
Figure 11B:
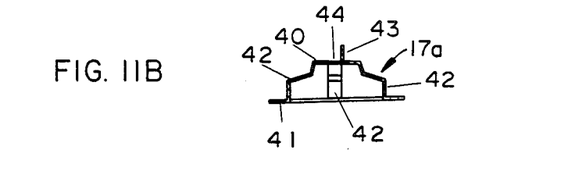

Referring to FIGS. 11A and 11B, the lead terminal 17a used for the third embodiment in FIG. 6 is shown. The lead terminal 17a comprises a central disc 40, an outer annular portion 41, and three supports 42 connecting the disc 40 and annular portion 41. Reference numeral 43 designates an upwardly projecting tab cut from the central disc 40, and 44 designates the opening left by the tab. The annular portion 41 of the lead terminal 17a is soldered to the electrode on the piezoelectric ceramic element 11 and the lead projection 14 on the terminal 13 is inserted into the bore 44 in the central disc 40 and soldered thereto.

The piezoelectric ceramic elements 11 in the respective embodiments has as the main component, for example, $Pb(Mg^{1}/3, Nb^{2}/3)O_3$, $PbTiO_3$ and $PbZrO_3$. When the piezoelectric element 11 and vibrating plate 8 have about equal coefficients of thermal expansion, a knock sensor having the stable property with respect to temperature change is obtainable. For example, when a three component piezoelectric ceramic is used which has a coefficient of thermal expansion of $9 \times 10^{-6}$, a Permalloy is suitable as the material for the vibrating plate.

EFFECT OF THE INVENTION

The knock sensor of the invention has the following advantages:

(1) Since a projection or annular projection is formed at the center of the vibrating plate, the vibrating plate has high rigidity at the center and is prevented from being subjected to mechanical strain which is generated when the vibrating is welded to the substrate and which spreads to the outer periphery of the vibrating plate, thereby avoiding the occurrence of an abnormal peak or dip in the frequency characteristics of the knock sensor.

(2) The substrate, vibrating plate, piezoelectric ceramic element and other parts are mounted on the connector unit side, and the casing and connector unit are made integral with each other after the lead projection on the terminal is connected with the electrode on the piezoelectric ceramic element, thereby facilitating the assembly and connection operations. On the contrary, with the conventional knock sensor, which assembles the vibrating plate, piezoelectric ceramic element and other parts in order into the casing, it is difficult to assemble and connect.

(3) A flexible wire is not used, but the lead projection on the terminal is used to extend through the substrate, vibrating plate and piezoelectric ceramic element and connects with the electrode thereof, so that disconnection caused by vibrations will not occur.

(4) A resistance of about $1\omega oCo$ can be connected to the load, the thickness ratio of the piezoelectric ceramic element to the vibrating plate is about 1:1, and the diameter ratio is about $1:\sqrt{2}$, whereby the $-3$ dB band width becomes larger so as to improve the responsiveness.

What is claimed is:

1. A knock sensor comprising:
   a substrate having a projection at the center of one surface thereof and a bore at the center thereof;
   a vibrating plate having a bore at the center thereof and having a plate rigidifying projection means at the center portion of one surface thereof, said central portion being welded to said projection on said substrate;
   a piezoelectric ceramic element having a bore in the center thereof and electrodes on opposite faces thereof and secured to the other surface of said vibrating plate; and
   a terminal having a lead projection extending through said bore in said substrate, said bore in said vibrating plate and said bore in said piezoelectric ceramic element and connected to the electrode on the face of said piezoelectric ceramic element which faces away from said vibrating plate.

2. A knock sensor as claimed in claim 1 wherein said vibrating plate and said ceramic element are round and the ratio of the diameter of said vibrating plate to the diameter of said ceramic element is $\sqrt{2}:1$.

3. A knock sensor as claimed in claim 1 in which said plate rigidifying projection means comprises a projection at the center of said vibrating plate.

4. A knock sensor as claimed in claim 1 in which said plate rigidifying projection means comprises an annular projection around the center of said vibrating plate.

5. A knock sensor as claimed in claim 1 further comprising an insulating connector unit at the surface of said substrate opposite the one surface thereof, said terminal forming part of said insulating connector unit.

6. A knock sensor as claimed in claim 5 further comprising a metallic casing open at one end and having an annular stepped portion within the casing, the circumference of said substrate being welded to said stepped portion for closing the casing and defining a space therewithin with said vibrating plate and ceramic element being within said space within said casing.

7. A knock sensor as claimed in claim 5 further comprising electrically insulating material filling the space around said terminal in the bores in said substrate, said vibrating plate and said ceramic element.

8. A knock sensor as claimed in claim 5 further comprising a threaded projection on the outer part of said casing and integral therewith.

9. A knock sensor as claimed in claim 5 in which said connector unit has a recess in the end face which is against said substrate, and further comprising a resistance member housed within said recess and having one terminal thereof electrically connected with said lead projection and having another terminal electrically connected with said substrate.

10. A knock sensor as claimed in claim 1 wherein said terminal comprises a metal foil soldered on the end of said lead projection and having the outer peripheral portion thereof soldered to said electrode on said ceramic element.

11. A knock sensor comprising:
  a substrate having a first projection at the center of one surface thereof, a plurality of second projections on the opposite surface thereof, and a bore at the center thereof;
  a metallic vibrating plate having a bore at the center thereof and having a plate rigidifying projection means at the center portion of one surface thereof, said central portion being welded to said first projection on said substrate;
  a piezoelectric ceramic element having a bore in the center thereof and electrodes on opposite faces thereof and secured to the other surface of said vibrating plate;
  an insulating connector unit having one end face opposed to the opposite surface of said substrate and having a plurality of recesses therein into which said second projections are press fitted, said connector unit including a terminal having a lead projection extending through said bore in said substrate, said bore in said vibrating plate and said bore in said piezoelectric ceramic element;
  an electrically conductive member connected between said lead projection and the electrode on the face of said piezoelectric ceramic element which faces away from said vibrating plate; and
  a metallic casing open at one end and having an annular stepped portion within the casing, the circumference of said substrate being welded to said stepped portion for closing the casing and defining a space therewithin with said vibrating plate and ceramic element being within said space within said casing, the end of said casing outwardly of said stepped portion being bent over against said connector unit.

* * * * *